United States Patent [19]
Hardin et al.

[11] Patent Number: 5,202,946
[45] Date of Patent: Apr. 13, 1993

[54] HIGH COUNT TRANSMISSION MEDIA PLENUM CABLES WHICH INCLUDE NON-HALOGENATED PLASTIC MATERIALS

[75] Inventors: Tommy G. Hardin, Lilburn, Ga.; Behrooz A. Khorramian, New York, N.Y.

[73] Assignee: AT&T Bell Laboratories, Murray Hill, N.J.

[21] Appl. No.: 839,196

[22] Filed: Feb. 20, 1992

[51] Int. Cl.$^5$ .............................................. G02B 6/44
[52] U.S. Cl. .................................................... 385/109
[58] Field of Search ................... 174/68.1, 98, 99 R, 174/107, 113 R, 121 A; 385/100–114

[56] References Cited
U.S. PATENT DOCUMENTS

| | | | |
|---|---|---|---|
| 4,941,729 | 7/1990 | Hardin et al. | 385/141 |
| 5,001,304 | 3/1991 | Hardin et al. | 174/107 |
| 5,024,506 | 6/1991 | Hardin et al. | 350/96.23 |
| 5,074,640 | 12/1991 | Hardin et al. | 385/109 |

*Primary Examiner*—Akm E. Ullah
*Assistant Examiner*—John Ngo
*Attorney, Agent, or Firm*—E. W. Somers; D. E. Hayes, Jr.

[57] ABSTRACT

A cable which may be used in buildings in concealed areas such as in plenums or in riser shafts includes a core (22) which in a metallic conductor cable includes at least twenty-five transmission media each of which is enclosed with a non-halogenated plastic material. The core is enclosed with a jacket (28) which also is made of a non-halogenated plastic material. The non-halogenated plastic material of the insulation is selected from the group consisting of a polyetherimide and a silicone-polyimide copolymer, or a blend comprising the polyetherimide and the silicone-polyimide copolymer. For the jacket, the plastic material includes a blend composition of silicone-polyimide copolymer and a flame retardant and smoke suppressant system comprising titanium dioxide and zinc borate.

8 Claims, 1 Drawing Sheet

HIGH COUNT TRANSMISSION MEDIA PLENUM CABLES WHICH INCLUDE NON-HALOGENATED PLASTIC MATERIALS

TECHNICAL FIELD

This invention relates to relatively high count transmission media plenum cables which include non-halogenated plastic materials. More particularly, the invention relates to relatively high count transmission media plenum cables which are used in buildings and which include non-halogenated insulation and jacketing materials that exhibit flame spread and smoke generation properties acceptable by industry standards as well as an acceptable toxicity level and relatively low corrosivity.

BACKGROUND OF THE INVENTION

In the construction of many buildings, a finished ceiling, which is referred to as a drop ceiling, is spaced below a structural floor panel that is constructed of concrete, for example. Light fixtures as well as other items appear below the drop ceiling. The space between the ceiling and the structural floor from which it is suspended serves as a return-air plenum for elements of heating and cooling systems as well as a convenient location for the installation of communications cables including data and signal cables for use in telephone, computer, control, alarm and related systems. It is not uncommon for these plenums to be continuous throughout the length and width of each floor. Also, the space under a raised floor in a computer room is considered a plenum if it is connected to a duct or to a plenum.

When a fire occurs in an area between a floor and a drop ceiling, it may be contained by walls and other building elements which enclose that area. However, if and when the fire reaches the plenum, and if flammable material occupies the plenum, the fire can spread quickly throughout an entire story of the building. The fire could travel along the length of cables which are installed in the plenum if the cables are not rated for plenum use. Also, smoke can be conveyed through the plenum to adjacent areas and to other stories.

A non-plenum rated cable sheath system which encloses a core of insulated copper conductors and which comprises only a conventional plastic jacket may not exhibit acceptable flame spread and smoke evolution properties. As the temperature in such a cable rises, charring of the jacket material begins. Afterwards, conductor insulation inside the jacket begins to decompose and char. If the jacket char retains its integrity, it functions to insulate the core; if not, it ruptures either by the expanding insulation char, or by the pressure of gases generated from the insulation exposed to elevated temperature, exposing the virgin interior of the jacket and insulation to elevated temperatures. The jacket and the insulation begin to pyrolize and emit more flammable gases. These gases ignite and, because of air drafts within the plenum, burn beyond the area of flame impingement, propagating flame and generating smoke and possibly toxic and corrosive gases.

As a general rule, the National Electrical Code (NEC) requires that power-limited cables in plenums be enclosed in metal conduits. The initial cost of metal conduits for communications cables in plenums is relatively expensive. Also, conduit is relatively inflexible and difficult to maneuver in plenums. Further, care must be taken during installation to guard against possible electrical shock which may be caused by the conduit engaging any exposed electrical service wires or equipment. However, the NEC permits certain exceptions to this requirement provided that such cables are tested and approved by an independent testing agent such as the Underwriters Laboratories (UL) as having suitably low flame spread and smoke-producing characteristics. The flame spread and smoke production of cable are measured using UL 910, Standard Test Method for Fire and Smoke characteristics of Electrical and Optical-Fiber Cables Used in Air-Handling Spaces. See S. Kaufman "The 1987 National Electric Code Requirements for Cable" which appeared in the 1986 International Wire and Cable Symposium Proceedings beginning at page 545. The UL 910 test is conducted in apparatus which is known as the Steiner Tunnel.

The prior art has addressed the problem of cable jackets that contribute to flame spread and smoke evolution also through the use of fluoropolymers. These, together with layers of other materials, have been used to control char development, jacket integrity and air permeability to minimize restrictions on choices of materials for insulation within the core. Commercially available fluorine-containing polymer materials have been accepted as the primary insulative covering for conductors and as a jacketing material for plenum cable without the use of metal conduit. However, fluoropolymer materials are somewhat difficult to process. Also, some of the fluorine-containing materials have a relatively high dielectric constant which makes them unattractive for communications media.

The problem of acceptable plenum cable design is complicated somewhat by a trend to the extension of the use of optical fiber transmission media from a loop to building distribution systems. Not only must the optical fiber be protected from transmission degradation, but also it has properties which differ significantly from those of copper conductors and hence requires special treatment. Light transmitting optical fibers are mechanically fragile, exhibiting low strain fracture under tensile loading and degraded light transmission when bent with a relatively low radius of curvature. The degradation in transmission which results from bending is known as microbending loss. This loss can occur because of coupling between the jacket and the core. Coupling may result because of shrinkage during cooling of the jacket and because of differential thermal contractions when the thermal properties of the jacket material differ significantly from those of the enclosed optical fibers.

The use of fluoropolymers for optical fiber plenum cable jackets requires special consideration of material properties such as crystallinity, and coupling between the jacket and an optical fiber core which can have detrimental effects on the optical fibers. If the jacket is coupled to the optical fiber core, the shrinkage of fluoropolymer plastic material, which is semi-crystalline, following extrusion puts the optical fiber in compression and results in microbending losses in the fiber. Further, its thermal expansion coefficients relative to glass are large, thereby compromising the stability of optical performance over varying thermal operation conditions.

Further, a fluoropolymer is a halogenated material. Although there exist cables which include halogen materials and which have passed the UL 910 test requirements, there has been a desire to overcome some problems which still exist with respect to the use of halogenated materials such as fluoropolymers and polyvinyl chloride (PVC). These materials exhibit undesired levels of corrosion. If a fluoropolymer is used, hydrogen fluoride forms under the influence of heat, causing corrosion. For a PVC, hydrogen chloride is formed.

In a more recently developed plenum cable, each transmission medium of a core of the cable is enclosed with a non-halogenated plastic material selected from the group consisting of a polyetherimide, a silicone-polyimide copolymer or blends of these two materials. A jacket encloses the core and is made of a non-halogenated plastic material which includes a silicone-polyimide copolymer constituent. The jacket may comprise as much as 100% by weight of the silicone-polyimide copolymer constituent.

The just-described cable is acceptable for a plenum cable having a relatively low number of transmission media. However, there is a need to provide a plenum cable which includes a relatively high number of transmission media such as, for example, at least twenty-five metallic conductor pairs.

The sought-after high number transmission media cable not only exhibits suitably low flame spread and low smoke producing characteristics provided by currently used cables which include halogenated materials but also one which meets a broad range of desired properties such as acceptable levels of corrosivity and toxicity. Such a cable does not appear to be available in the prior art. What is further sought is a cable which is characterized as having relatively low corrosive properties, and acceptable toxic properties, as well as low levels of smoke generation and one which may include a relatively high number of transmission media.

SUMMARY OF THE INVENTION

The foregoing problems of the prior art have been overcome with the cables of this invention. A cable of this invention comprises a core which includes a relatively high number of transmission media. For communications use, each transmission medium may be an optical fiber or a metallic conductor. For a metallic conductor cable, at least twenty-five pairs of metallic conductors are included.

Each transmission medium is enclosed with a non-halogenated plastic material selected from the group consisting of a polyetherimide, a silicone-polyimide copolymer or blends of these two materials. A jacket encloses the core and is made of a non-halogenated plastic material which includes a silicone-polyimide copolymer constituent and a smoke suppressant and flame retardant system. The smoke suppressant and flame retardant system includes titanium dioxide in the range of about 0.5 to 15 percent by weight and zinc borate in the range of about 0.5 to 15 percent by weight with the combination of zinc borate and titanium dioxide not exceeding about 20% by weight of the composition of the jacket. The jacket may comprise as much as 99% by weight of the silicone-polyimide copolymer constituent.

Advantageously, the cables of this invention may be used in building plenums and/or risers. They are acceptable by UL 910 test requirements for flame spread and smoke generation. Further, they exhibit acceptable levels of toxicity and relatively low corrosivity.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
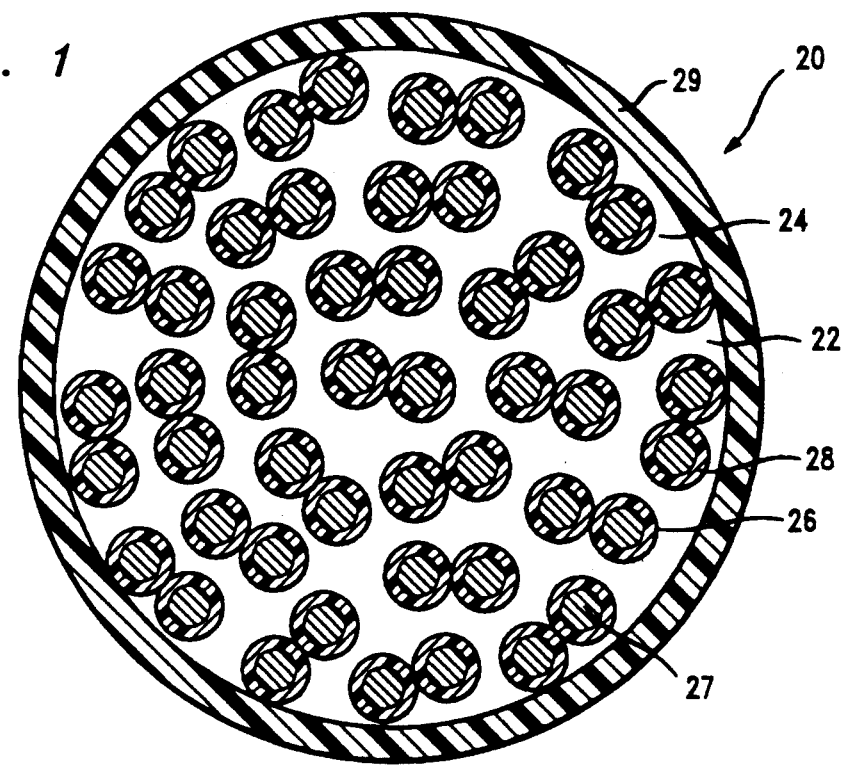
FIG. 1 is an end cross-sectional view of a cable with at least twenty-five pairs of insulated metallic conductors.
Figure 2:
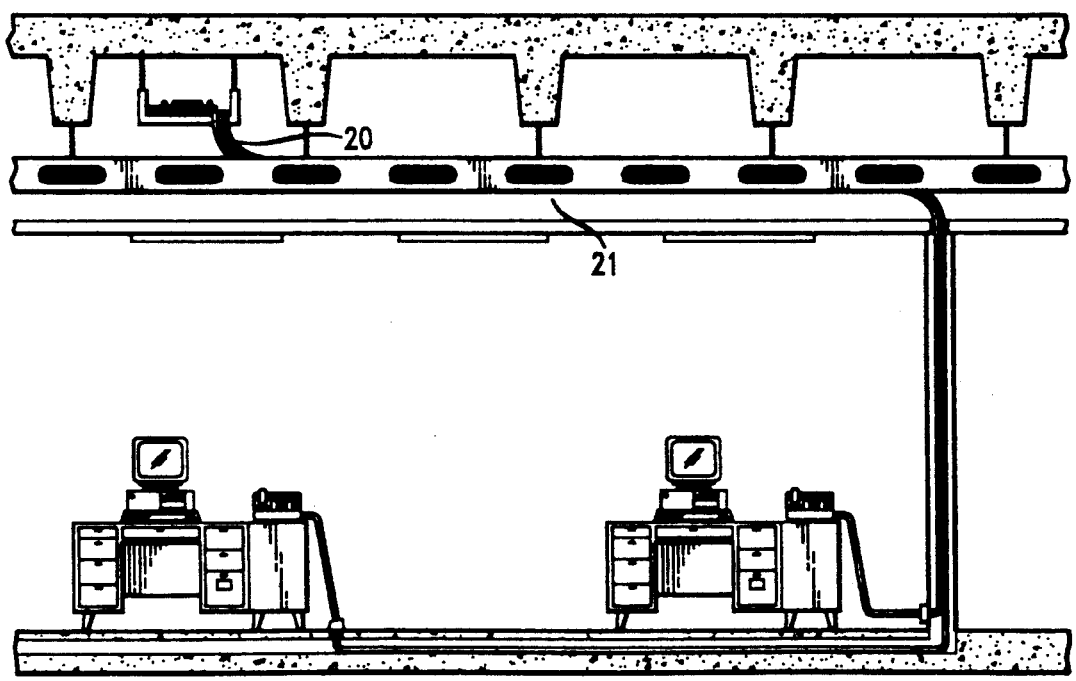
FIG. 2 is an elevational view of a portion of a building which includes a plenum, depicting the use of cables of this invention.

Referring now to FIG. 1, there is shown a cable which is designated generally by the numeral 20 and which is capable of being used in buildings in plenums. A typical building plenum 21 is depicted in FIG. 2. There, a cable 20 of this invention is disposed in the plenum. As can be seen in FIG. 1, the cable 20 includes a core 22 which comprises a relatively large number of transmission media and which may be enclosed by a core wrap (not shown). Each transmission medium may comprise a metallic insulated conductor or an optical fiber which includes at least one layer of coating material. The core 22 may be one which is suitable for use in data, computer, alarm and signaling networks as well as in voice communication.

For purposes of the description hereinafter, the transmission medium comprises twisted pairs 24—24 of insulated metallic conductors 26—26. Although some cables which are used in plenums may include only one to four pairs, many such cables include twenty-five pairs and possibly one-hundred or more conductor pairs.

Each insulated metallic conductor 26 includes a longitudinally extending metallic conductor portion 27. In order to provide the cable 20 with flame retardancy, low corrosivity, acceptable toxicity and low smoke generation properties, the metallic conductors are provided with an insulation 28 comprising a plastic material which provides those properties.

The metallic conductors each may be provided with an insulation cover comprising a polyetherimide. Polyetherimide is an amorphous thermoplastic resin which is available commercially, for example, from the General Electric Company under the designation ULTEM ® resin. The resin is characterized by high deflection temperature of 200° C. at 264 psi, a relatively high tensile strength and flexural modulus and very good retention of mechanical properties at elevated temperatures. It inherently is flame resistant without the use of other constituents and has a limiting oxygen index of 47.

Polyetherimide is a polyimide having other linkages incorporated into the polyimide molecular chain to provide sufficient flexibility to allow suitable melt processability. It retains the aromatic imide characteristics of excellent mechanical and thermal properties. Polyetherimide is described in an article authored by R. O. Johnson and H. S. Burlhis entitled "Polyetherimide: A New High-Performance Thermoplastic Resin" which appeared beginning at page 129 in the 1983 Journal of Polymer Science.

The insulation composition comprising a polyetherimide also includes an additive system which includes an antioxidant/thermal stabilizer, and a metal deactivator. See U.S. Pat. No. 5,074,640, which issued on Dec. 24, 1991, in the names of T. G. Hardin, W. F. Moore, J. J. Mottine, Jr., J. D. Nielson and Lloyd Shepherd and which is incorporated by reference hereinto. Also included in the composition of the insulation may be a suitable lubricant. The additive system may be included in a color concentrate which is added to the polyetherimide at the feed zone of an extruder (not shown). Alternatively, it may be premixed with the polyetherimide constituent.

In a preferred embodiment, the additive system includes about 0.15% by weight of an antioxidant/thermal stabilizer. It has been found that a high molecular weight hindered phenolic antioxidant/thermal stabilizer such as one available commercially from the Fairmount Chemical Company, Inc. under the trade designation Mixxim ® AO-30 is suitable. The last mentioned material has the chemical name 1,1,3-tris (2-methyl-4-hydroxy-5-tert-butylphenyl)-butane. It is a non-staining, high molecular weight hindered phenolic compound which inhibits thermo-oxidative degradation. It provides excellent protection against oxidation when used at levels of 0.02 to 1% by weight. It has a melting point in the range 185° C. to 190° C. and a molecular weight of 544. It is disclosed in a product brochure available from the Fairmount Chemical Company with a revision data of Mar. 31, 1983. Generally, its prior art use has been as an antioxidant in products that are in contact with food.

Combined with the antioxidant/thermal stabilizer is a metal deactivator in the amount of about 0.15% by weight. It has been found that a high molecular weight metal deactivator is suitable for inclusion in the composition of this invention. The metal deactivator inhibits degradation caused by copper or copper oxide, thereby reducing the adhesion of the plastic insulation to the metallic conductor. More particularly, a metal deactivator with the chemical name N, N'-bis[3-(3',5-di-tert-butyl-4'-hydroxyphenyl-propanyl]hydrazine, and available from the Ciba-Geigy Company as Irganox ® MD-1024 metal deactivator, is used in the preferred embodiment.

It has been found that the elongation of the insulation 28 may be increased by including titanium dioxide in the additive system. In a preferred embodiment, the titanium dioxide is included in the amount of about 0.2 to 10% by weight.

The additive system provides a synergistic effect for the protection of the insulation 28 during processing and long-term aging. In an embodiment which meets UL elongation tests, the range for each constituent of the additive system may be as high as about 1.0% by weight.

As will be recalled, the higher the melt index of the plastic material to be extruded, the better the flow properties during extrusion. Tests were run to determine the melt index of off-the-shelf polyetherimide material. At temperatures of 390° C., 340° C. and 315° C., the melt index ranges reported were 8-10, 1.5-2.5 and 0.7-1, respectively. For other materials used as insulation, the melt index is substantially higher. The melt index of Teflon ® plastic material, for example, is in the range of about 24-29.5. Advantageously, the additive package system of the composition of this invention resulted in a melt index in the range of 22-24 at 315° C. which is significantly higher than the melt index of off-the-shelf polyetherimide.

Further, the stabilizing additive system, in addition to providing protection from thermo-oxidative degradation during processing, also coats the inner surface of an extruder barrel and outer surfaces of pellets supplied to the extruder, thereby acting as a lubricant. This facilitates the use of reduced extrusion temperatures which helps to avoid degradation of the plastic material during extrusion. A 10° to 30° C. reduction in extrusion temperatures can be achieved.

It has been found that polyetherimide has a relatively strong affinity for copper. As a result, when polyetherimide insulation is extruded over a copper conductor, adhesion of the insulation to the copper may be undesirably high. This high adhesion is indicative of some degradation of the insulation.

In order to avoid this problem, insulation 28 may comprise additional constituents. For example, a relatively small amount by weight of a silicone-polyimide copolymer may be included in the additive system as a lubricant to improve the material processing and improve the physical properties. Silicone-polyimide copolymer is a flame-resistant non-halogen thermoplastic material. One such material is designated SILTEM TM copolymer and is available commercially from the General Electric Company. The silicone-polyimide content of such a blend composition may range from 0% to 10%, with a preferred range of 0.5 to 2.0% by weight. High temperature sulfonamide plasticizers and high molecular weight stearate lubricants such as cerium stearate, have also been shown to be suitable for this application.

It should be noted that the insulation 28 may comprise materials other than the polyetherimide. For example, the insulation may be a composition comprising a silicone-polyimide copolymer or a composition comprising a blend of a polyetherimide and a silicone-polyimide copolymer. A suitable silicone material is the above-mentioned SILTEM TM copolymer. The polyetherimide of the blend composition ranges from slightly above 0% to slightly below 100% by weight of the composition, and the silicone-polyimide copolymer ranges from slightly above 0% to slightly below 100% by weight of the composition.

For optical fiber cables in which optical fibers are provided with a buffer layer, a silicone-polyimide copolymer is preferred as the material for the buffer layer. The silicone-polyimide copolymer has a lower modulus than the polyetherimide which reduces the possibility of inducing microbending loss into the optical fibers.

About the core is disposed a jacket 29. The jacket 29 is comprised of a plastic material, which includes a silicone-polyimide copolymer constituent which may also be used as the insulation cover for the metallic conductors. The jacket 29 also may comprise a blend composition comprising a silicone-polyimide copolymer and a polyetherimide.

Additionally, for the jacket, a system which does not exceed about 20% by weight is added to any of the singular materials or blends in order to enhance sufficiently the flame retardance and smoke suppression of the cable so that it can accommodate a relatively high number of transmission media. Among those systems which sufficiently enhance flame retardancy and smoke suppression are a blend composition of zinc borate ranging from 0.5 to 15% and titanium dixoide ranging 0.5 to 15%. A preferred embodiment includes 1% by weight of zinc borate and 1% by weight of titanium dioxide.

In the past, the cable industry in the United States has shield away from non-halogenated materials for use in plenum cables. These non-halogenated materials which possess desired properties seemingly were too inflexible to be used in such a product whereas those non-halogenated materials which had the desired amount of flexibility did not meet the higher United States standards for plenum cable.

Surprisingly, the cable of this invention which includes non-halogenated insulation and jacketing materials not only meets acceptable industry standards for flame spread and smoke generation properties, but also it has relatively low corrosivity and an acceptable level of toxicity. The result is surprising and unexpected because it had been thought that non-halogenated materials which would have acceptable levels of flame spread and smoke generation were excessively rigid and that those which had suitable flexibility would not provide suitable flame spread and smoke generation properties to satisfy industry standards. The conductor insulation and the jacketing material of the claimed cable cooperate to provide a system which delays the transfer of heat to the transmission members. Because conductive heat transfer, which decomposes conductor insulation, is delayed, smoke emission and further flame spread are controlled.

Flame spread and smoke evolution characteristics of cables may be demonstrated by using a well known Steiner Tunnel test in accordance with ASTM E-84 as modified for communications cables and now referred to as the UL 910 test. The UL 910 test is described in the previously identified article by S. Kaufman and is a test method for determining the relative flame propagation and smoke generating characteristics of cable to be installed in ducts, plenums, and other spaces used for environmental air. Tests have shown that heat is transferred to the cable core 22 principally by thermal radiation, secondly by conduction and finally by convection.

During the Steiner Tunnel test, flame spread is observed for a predetermined time and smoke is measured by a photocell in an exhaust duct. For a cable to be rated as plenum, i.e. type CMP, according to the National Electric Code, flame spread must not exceed five feet. A measure of smoke evolution is termed optical density-which is an obscuration measurement over a length of time as seen by an optical detector. The lower the optical density, the lower and hence the more desirable is the smoke characteristic. A cable designated CMP must have a maximum smoke density which is 0.5 or less and an average smoke density which is 0.15 or less.

Toxicity generating characteristics of cables may be demonstrated by a toxicity test developed by the University of Pittsburgh. In this test, a parameter referred to as $LC_{50}$, which is the lethal concentration of gases generated from the burning of a material which causes a 50% mortality among an animal population, that is, 2 out of 4 mice, for example, is measured. $LC_{50}$ is an indication of the toxicity of a material caused by the smoke generated by its burning. The higher the value of the $LC_{50}$, the lower the toxicity. The higher the $LC_{50}$ value, the more material that must be burned to kill the same number of test animals. It is important to recognize that $LC_{50}$ is measured for the plastic material used in the cable without the metallic conductors. The $LC_{50}$ values for cables of this invention were higher than those for comparable cables which included halogenated materials.

Low corrosion characteristics of the cables may be demonstrated by the measurement of the acid gases generated from the burning of the cable. The higher the percent acid gas generated, the more corrosive is the plastic material which encloses the transmission media. This procedure is currently used in a U.S. government military specification for shipboard cables. According to this specification, 2% acid gas, as measured in terms of percent hydrogen chloride generated per weight of cable, is the maximum allowed. Plenum cables of this invention showed 0% generation of acid gas.

Test results for example cables of this invention as well as for similar plenum cables having halogenated materials for insulation and jacketing are shown in TABLE I hereinafter. Being plenum rated, the cables of TABLE I pass the UL 910 test for flame spread and smoke generation.

Example cables were subjected to tests in a Steiner Tunnel in accordance with the priorly mentioned UL 910 test and exposed to temperatures of 904° C., or incident heat fluxes as high as 63 kw/m².

TABLE I

| PROPERTY | HALO-GENATED | | NON HALOGENATED | | |
|---|---|---|---|---|---|
| | PLENUM CABLE EXAMPLE | | | | |
| | 1 | 2 | 3 | 4* | 5* |
| A. Smoke generation | | | | | |
| max optical density | 0.276 | 0.300 | 0.482 | 0.40 | 0.47 |
| avg. optical density | 0.112 | 0.057 | 0.054 | 0.08 | 0.08 |
| B. Corrosivity | | | | | |
| % acid-gas generation | 42.20 | 30.79 | 0 | 0 | 0 |
| C. $LC_{50}$ (grams) | 25 ± 7 | 12 ± 2 | 40 ± 5 | 40 | 40 |
| D. Outside Diameter (inch) | 0.139 | 0.140 | 0.152 | 0.34 | 0.34 |
| E. Jacket thickness (inch) | 0.010 | 0.012 | 0.016 | 0.012 | 0.012 |

*Twenty-Five Pair Metallic Conductor Cable

Examples 1, 2, and 3 in TABLE I each included four pairs of 24 gauge copper conductors each having a 0.006 inch thick insulation cover. The insulation and jacket of Example Nos. 1 and 2 comprised a fluoropolymer. The insulation and the jacket of cables of Example 3 were comprised of non-halogenated plastic materials. For Example No. 3, the insulation and jacket each comprised a blend comprising 50% by weight of UL-TEM ® resin and 50% of SILTEM ™ copolymer. For Example No. 4, the insulation was ULTEM plastic material and the jacket comprised a blend of 98% SILTEM copolymer, 1% titanium dioxide and 1% zinc borate. For example No. 5, the jacket comprised a blend of 98% SILTEM copolymer, 1% titanium dioxide and 1% zinc borate.

The cables of this invention include transmission media covers and jackets which have a range of thickness. But in each case, the cable passes the flame retardancy and smoke characteristics tests which are required today by the UL 910 test as well as provides relatively low corrosivity and acceptable toxicity.

The sheath system 30 of this invention (a) delays the transfer of conducted heat to the core 22 which produces less insulation deterioration which in turn produces less smoke and therefore less flame spread; (b) effectively reflects the radiant energy present throughout the length of the UL 910 test; (c) eliminates premature ignition at the overlapped seams; and (d) allows the insulation to char fully thereby blocking convective pyrolytic gas flow along the cable length. Further, it provides relatively low corrosivity and acceptable levels of toxicity.

It is to be understood that the above-described arrangements are simply illustrative of the invention. Other arrangements may be devised by those skilled in the art which will embody the principles of the invention and fall within the spirit and scope thereof.

We claim:

1. A communications cable, which is suitable for building plenum use, said cable comprising:
   a core which comprises a relatively large number of communications transmission media, each communications transmission medium being enclosed with a plastic material which is selected from the group consisting of a polyetherimide, a silicone-polyimide copolymer, and compositions which include a polyetherimide and a silicone-polyimide copolymer; and
   a jacket which encloses said core and which comprises a plastic material comprising a silicone-polyimide copolymer and a system comprising a composition which includes titanium dioxide and zinc borate that enhances the flame retardancy and smoke suppression characteristics of said cable sufficiently to protect a relatively large number of transmission media.

2. The cable of claim 1, wherein said jacket is a composition which comprises as much as 20% by weight of said composition of titanium dioxide and zinc borate.

3. The cable of claim 2, wherein said titanium dioxide and said zinc borate each is included in the amount of about 0.5 to 15% by weight of said composition.

4. The cable of claim 1, wherein said blend composition comprises 1% by weight of titanium dioxide and 1% by weight of zinc borate.

5. The cable of claim 1, wherein said jacket is a composition which comprises a polyetherimide and a silicone-polyimide copolymer and as much as about 20% by weight of said composition of titanium oxide and zinc borate.

6. The cable of claim 1, which also includes a core wrap which is disposed between said core and said jacket.

7. The cable of claim 1, which also includes a metallic shield, said metallic shield being disposed between said core and said jacket.

8. The cable of claim 1, wherein each transmission medium in said core comprises an optical fiber and said plastic material which encloses said optical fiber is a buffer layer comprising a silicone-polyimide copolymer.

* * * * *